of the α-modification are set free in a pure form from the
United States Patent [19]

Spietschka et al.

[11] 3,984,433

[45] Oct. 5, 1976

[54] PROCESS FOR PREPARING COPPER PHTHALOCYANINE PIGMENTS OF THE α-MODIFICATION

[75] Inventors: Ernst Spietschka, Oberauroff, Taunus; Siegfried Schiebler; Wolfgang Tronich, both of Frankfurt am Main, all of Germany

[73] Assignee: Hoechst Aktiengesellschaft, Frankfurt am Main, Germany

[22] Filed: Dec. 21, 1973

[21] Appl. No.: 427,314

[30] Foreign Application Priority Data

Dec. 22, 1972 Germany.......................... 2262911

[52] U.S. Cl................................... 260/314.5; 8/7; 8/62; 106/23; 260/37 P; 428/457
[51] Int. Cl.²........................................ C09B 47/08
[58] Field of Search................................ 260/314.5

[56] References Cited
UNITED STATES PATENTS

| | | | |
|---|---|---|---|
| 2,284,685 | 6/1942 | Detrick et al.................... | 260/314.5 |
| 2,602,800 | 7/1952 | Barnhart.......................... | 260/314.5 |
| 3,252,991 | 5/1966 | Schmidt et al.................. | 260/314.5 |
| 3,717,493 | 2/1973 | Griswold........................... | 260/314.5 |

FOREIGN PATENTS OR APPLICATIONS

| | | | |
|---|---|---|---|
| 1,096,192 | 12/1967 | United Kingdom.............. | 260/314.5 |

OTHER PUBLICATIONS

Fiat Report 1313, p. 303, (Feb. 1948).

*Primary Examiner*—John D. Randolph
*Attorney, Agent, or Firm*—Curtis, Morris & Safford

[57] ABSTRACT

A process for preparing very pure copper phthalocyanine pigments of the α-modification, wherein substituted or unsubstituted copper phthalocyanines having different degrees of purity are converted into copper phthalocyanine salts capable of being isolated, with the aid of suitable acids which dissolve the impurities contained in the dyestuff, wherein these salts are separated from the acid, the copper phthalocyanines of the α-modification are set free in a pure form from the copper phthalocyanine salts by the action of water and wherein the isolated copper phthalocyanine is subject in an aqueous suspension to a mechanical fine division. This process yields copper phthalocyanines of the α-modification in a very pure form without causing problems with respect to the waste water.

4 Claims, No Drawings

PROCESS FOR PREPARING COPPER PHTHALOCYANINE PIGMENTS OF THE α-MODIFICATION

The present invention relates to the preparation of very pure copper phthalocyanine pigments of the α-modification with coloristically interesting shades and a high tinctorial strength.

To convert a crude phthalocyanine into a phthalocyanine pigment of the α-modification, there are applied above all the salt grinding process and a treatment with sulfuric acid of a suitable concentration. The salt grinding has the disadvantage that no effect of purification is obtained and that the pigment thus prepared according to the origin and purity of the product may be exposed to coloristical fluctuations.

A considerable disadvantage is that large amounts of the salt-containing washing water are obtained the elimination of which by the waste water raises problems and costs.

As it is known for example from U.S. Pat. specifications Nos. 2,192,704 and 2,334,812, phthalocyanine pigments of the α-modification can also be prepared by dissolving or suspending a crude phthalocyanine in concentrated sulfuric acid and subsequently bringing it into a finely divided form by introducing the solution or suspension of the phthalocyanine sulfate formed into an excess of water, then filtering and drying. However, the complete elimination of undesired impurities is not ensured.

Therefore, according to U.S. Pat. specification Nos. 2,284,685 and 2,365,464, an improved process for preparing pure phthalocyanine pigments of the α-modification consists in dissolving crude phthalocyanine in concentrated sulfuric acid and subsequently reducing the concentration of sulfuric acid by addition of water until the phthalocyanine precipitates in the form of its sulfate and may be isolated. The phthalocyanine sulfate thus purified is dissolved again in concentrated sulfuric acid and the phthalocyanine is set free in a fine division by introducing the solution into an excess of water.

But this process has decisive economical and technical disadvantages. Thus, for example, filtration of the finely divided phthalocyanines of the α-modification, due to the large amounts of acid, brings about a considerable expenditure of time, technical equipment and costs.

The decisive disadvantage, however, is that the elimination of the large amounts obtained or contaminated and very diluted sulfuric acid causes problems for the waste water.

The dressing of the diluted acid, however, is combined with a high expenditure of costs.

It has now been found that very pure phthalocyanine pigments of the α-modification can be prepared without any problems for the waste water, by converting crude phthalocyanines of any desired purity with the aid of suitable acids, which dissolve the disturbing contaminations, into salts, by isolating them, by decomposing the phthalocyanine salts obtained in a pure form, by introducing them into water, while setting free the pure phthalocyanines, and by subjecting these compounds after filtration, in the presence of water, to a mechanical fine division, neutral with regard to the water water, to obtain the phthalocyanine pigment.

On the principle, for the process all phthalocyanines are suitable which, under the conditions applied, are not subject to irreversable changes and may be converted into the α-modification.

However, copper phthalocyanines and halogenated copper phthalocyanines are especially suitable.

The acids used for the process claimed are all acids which are able to convert the phthalocyanines mentioned without irreversable modification of the phthalocyanine molecule into salts capable of being isolated, which dissolve the contaminations furthermore contained in the crude phthalocyanine and the regeneration of which may be carried out at a favorable cost and without problems. Sulfuric acid is especially suitable for this purpose.

For the mechanical fine division all processes may be used which bring about a comminution of dyestuff grains to a pigment size, such as for example in kneaders, high-speed mixers with grinding effect or in grinding devices, the principle of which is based on the bounding effect or the mutual friction of grinding auxiliaries by rotation or vibration, and which can be designed for a discontinuous or continuous working. Vibratory mills, ball mills, perl mills, friction-split mills and vibration ball mills are preferably used. The choise of the mills, of the grinding elements used, as well as of time and temperature of grinding depends on the tinctorial properties desired of the copper phthalocyanine pigment to be prepared, but in general, it corresponds to the practice usual for pigment grinding.

The grinding process itself does not require any additives, but to improve the tinctorial and rheological properties of the copper phthalocyanine pigments, suitable substances in amounts usual in practice can be added, if desired, to the grinding preparation, such as for example cation-active, anion-active or neutral surface-active substances.

Grinding is preferably effected in an aqueous medium without additives. It is also possible to add substances improving the pigment properties after the fine division.

The pigment is separated from the grinding elements and subsequently dried according to the processes usual in practice.

The copper phthalocyanine sulfate is prepared for example by dissolving the crude phthalocyanine in 4 to 10 times the amount of a 96 to 100% sulfuric acid and subsequently diluting with water orddiluted sulfuric acid to an acid content of 86 to 80%, whereby the copper phthalocyanine sulfate is precipitated.

The copper phthalocyanine sulfate can also be prepared by introducing the copper phthalocyanine into a 80 to 86% sulfuric acid. Then the copper phthalocyanine sulfate is suction-filtered at room temperature, washed with a small amount of a 80–86% sulfuric acid and decomposed by introducing it into 4 to 10 times the amount of water, calculated on the dry crude dyestuff. The copper phthalocyanine thus purified is filtered, washed free from acid with water and then subject, in the form of its aqueous filter cake, to a mechanical fine division to obtain the pigment.

In special cases the aqueous pigment suspension thus obtained may be after-treated by heating with water and/or water-miscible or not water-miscible liquids in closed vessels or in other suitable open or closed vessels, to improve additionally the tinctorial and rheological properties. For this purpose only those copper phthalocyanine pigments are suitable, which under the conditions chosen are resistant to the change of modification.

The sulfuric acid obtained in the preparation of the copper phthalocyanine sulfate may be used again for the purification of the copper phthalocyanine after adjusting to the original acid concentration and after replacing the loss of sulfuric acid. More strongly contaminated sulfuric acid can be purified according to one of the known regenerating processes and recycled. As regenerating processes are considered the Pauling process, the thermal splitting process or the distillation.

The dilute sulfuric acid formed during the decomposition with water and the subsequent washing until neutral, is free from organic or inorganic contaminations and may, therefore, be used directly for the precipitation of copper phthalocyanine sulfate from the concentrated sulfuric acid, or adjusted to the original concentration according to the immersion heating process and used again to dissolve the crude phthalocyanine.

As compared with the traditional process the process claimed has the following advantages: 1. The copper phthalocyanine purification process provides sulfuric acid easy to regenerate and does not present in any phase any problems with contaminated waste waters. 2. The aqueous filter cakes of phthalacyanine purified via the sulfate and washed free from acid are especially suitable for a mechanical fine division, for example by grinding in the presence of suitable grinding elements, since the pigment properties desired are already obtained after a grinding time of 1 to 8 hours. 3. A great advantage is the fact that the copper phthalocyanine is exposed in pure form to the mechanical fine division, for example by grinding and that, thus no water-soluble contaminations, as for example inorganic copper salts causing special problems for the waste water, reach the aqueous grinding medium. Therefore, the filtrate of the aqueous grinding batch does not contain any substance contaminating the waste water. 4. The process is especially simple and at a favourable cost by the fact that due to the purity of the copper phthalocyanine filter cake used for aqueous grinding, it may be dispensed completely with filtration, if the concentration of the aqueous pigment paste is chosen accordingly and that this paste, after separating it from the grinding elements can be evaporated to dryness directly in suitable dyeing devices without being detrimental to the quality of the pigment. Thus, it is possible for example, when using continuously working grinding devices such as high-speed vibration ball mills, to introduce the aqueous pigment paste freed automatically from the grinding elements, directly into the usual continuously working drying apparatuses and dry it. 5. The copper phthalocyanine pigments prepared according to the process claimed are characterized by a high tinctorial strength and purity, as well as by a reddish-blue shade interesting for many fields of application and which is superior to that of the pigments of the commercial α-modification.

The copper phthalocyanie pigments prepared according to the process claimed are suitable for coloring lacquers, paper, plastics and synthetic resins, for the dyeing of synthetic fibres in the mass which are obtained for example by spinning organic fibre-forming polymers dissolved in special solvents, for printing paper and textiles and for metal effect lacquerings.

The following Examples illustrate the invention. Parts and percentages are by weight unless stated otherwise and the temperature is indicated in centigrades.

EXAMPLE 1

100 Parts of crude copper phthalocyanine (in the form of a 95% commercial product) were dissolved in 1000 parts of concentrated hydrochloric acid. By adding dropwise 163 parts of water the copper phthalocyanine was precipitated as sulfate, suction-filtered on an acid-proof filter and washed with 200 to 300 parts of an about 80% sulfuric acid. The filter cake of the copper phthalocyanine sulfate was introduced by stirring into 1000 parts of water, the pure copper phthalocyanine formed was suction-filtered and washed until neutral. After addition of 81 parts of water, 39 parts of the aqueous filter cake thus prepared having a content of solids of 51.5% were ground for 8 hours on a vibratory table in a 1 liter procelain mill which contained 1200 parts of quartzite perls with a diameter of 2 mm. The dyestuff was separated from the grinding elements and dried without filtration, at 50°–60°C, in vacuo.

With the pigment powder thus obtained dyeings are obtained in PVC according to known methods, which have a higher tinctorial strength than the dyeings prepared with comparable commercial dyestuffs and have a purer reddish blue shade.

The about 80 to 85% sulfuric acid obtained during purification could be regenerated by distillation. The dilute sulfuric acid obtained when washing until neutral was used in a second batch instead of water to precipitate the copper phthalocyanine sulfate.

EXAMPLE 2

As compared with Example 1, 40 parts of a 50% aqueous copper phthalocyanine filter cake was used for grinding; the filter cake was prepared as follows: the crude copper phthalocyanine was dissolved in a 96% sulfuric acid, then precipitated as copper phthalocyanine sulfate by reducing the acid concentration by dropwise addition of water to 86%; in this filter cake, before suction-filtering and washing free from acid by heating for 3 to 4 hours, a growth of the crystals of the copper phthalocyanine sulfate was obtained.

EXAMPLE 3

A vibration ball mill of Messrs. Netzsch (content of grinding vessel 29 liters; revolutions of the stirrer 368 r/min) provided with quartzite perls of a diameter of about 2 mm, was filled continuously with about 60,000 parts of a homogenized aqueous suspension of a copper phthalocyanine of the α-modification, which was purified over the sulfate according to the process described in Example 1 and brought to a dyestuff content of about 30% by addition of water. The pigment suspension was taken off after two passages and introduced without filtration into a continuous drying device.

With the pigment powder thus prepared PVC-colorations can be prepared according to known methods which have a high tinctorial strength and purity, as well as a strongly reddish blue shade which are superior to the dyeings obtained with commercial dyestuffs.

Example 4

91 Parts of a 44% aqueous filter cake of a copper phthalocyanine of the α-modification having a content of chlorine of about 3% (prepared by reacting 4-chloro-phthalic acid anhydride, phthalic acid anhydride, urea and copper sulfate in the presence of nitrobenzene) and, as indicated in Example 1, purified over the phthalocyanine sulfate, were ground for 5 hours on a vibration table, after addition of 149 parts of water and 1 part of a surface-active substance, for example Genapol C-080, in a 1 liter porcelain mill which contained 1250 parts of quartzite perls having a diameter of about 1 mm. The pigment was separated from the grinding elements and evaporated to dryness under reduced pressure at 50°–60°C. With the pigment thus obtained, there may be prepared according to the known methods colorations of enamels which have a purer and redder shade as compared with the colorations prepared with comparable commercial dyestuffs.

EXAMPLE 5

100 Parts of crude copper phthalocyanine (in the form of a 95% commercial product) were dissolved in 500 parts of a 2% oleum and chlorinated with chlorine to a chlorine content of 5.8%. Then the chlorinated copper phthalocyanine was precipitated by dropwise addition of 84 parts of water as sulfate, suction-filtered and washed with 100 g of a 80% sulfuric acid. The filter cake of the chlorinated copper phthalocyanine sulfate was introduced by stirring into 500 parts of water, the chlorinated pure copper phthalocyanine was suction-filtered and washed neutral with water.

After addition of 155 parts of water, 85 parts of the 47% aqueous filter cake were ground for 5 hours on a vibration table in a one liter porcelain mill, which contained 1250 parts of quartzite perls having a diameter of about 1 mm. The pigment was separated from the grinding elements and the aqueous paste was evaporated to dryness under reduced pressure without filtration at 50°–60°C.

The pigment powder thus prepared provided colorations of enamels which were characterized by a high purity, color intensity, brilliance of the shade and high transparency and which are superior with these properties to the colorations of commercial comparable products.

EXAMPLE 6

100 Parts of crude copper phthalocyanine (in the form of a 95% commercial product) were dissolved in 500 parts of a 2% oleum and brominated with bromine to a bromine content of 7 to 8%. By adding dropwise 84 parts of water the copper phthalocyanine sulfate was precipitated, suction-filtered and washed with a small amount of a 80% sulfuric acid. The filter cake was introduced while stirring into 500 parts of water, the brominated pure copper phthalocyanine set free was suction-filtered and washed neutral with water.

After addition of 140 parts of water, 100 parts of the 40% aqueous filter cake thus prepared were ground for 8 hours on a vibration table, in a one liter porcelain mill which contained 1250 parts of quartzite perls having a diameter of about 1 mm. The pigment was separated from the grinding elements, filtered and dried under reduced pressure at 50°–60°C. The pigment powder thus prepared colored enamels in very pure reddish blue shades having a high transparency and color intensity.

We claim:

1. A process for the preparation of a very pure copper phthalocyanine pigment of the $\alpha$-modification which comprises: converting unsubstituted or halogenated copper phthalocyanine capable of forming an $\alpha$-modification into the sulfate by
   a. either dissolving it in 96 to 100% sulfuric acid and subsequently diluting the solution with water or dilute sulfuric acid to an acid concentration of 86 to 80%, or
   introducing it into 80 to 86% sulfuric acid; isolating the precipitated copper phthalocyanine sulfate; hydrolizing it by introducing it into water; isolating the so-obtained copper phthalocyanine; washing it free of acid with water; and subjecting it to a mechanical fine distribution in a suspension in water.

2. A process as claimed in claim 1, wherein the halogenated $\alpha$-copper phthalocyanine is a chlorinated or brominated $\alpha$-copper phthalocyanine.

3. A process as claimed in claim 1, wherein the copper phthalocyanine sulfate is prepared by dissolving the copper phthalocyanine in 4 to 10 times the amount of a 96 to 100% sulfuric acid.

4. A process as claimed in claim 1, wherein the copper phthalocyanine sulfate is hydrolized by introducing it into 4 to 10 times the amount of water, calculated on the dry crude dyestuff.

* * * * *